United States Patent
Komatsu

(10) Patent No.: US 6,442,662 B1
(45) Date of Patent: *Aug. 27, 2002

(54) MEMORY MANAGEMENT DEVICE INCLUDING A FREE BLOCK TABLE AND A CONVERSION TABLE WITH A FREE BLOCK ADDRESS DATA IDENTIFICATION COMPONENT

(75) Inventor: Shinpei Komatsu, Yokohama (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/544,850

(22) Filed: Oct. 18, 1995

(30) Foreign Application Priority Data

Jan. 19, 1995 (JP) .............................. 7-006199

(51) Int. Cl.⁷ .............................. G06F 12/00
(52) U.S. Cl. .................. 711/202; 711/170; 707/205
(58) Field of Search ............... 395/621, 497.01, 395/412, 421.11, 441, 489, 495; 711/170, 202, 221, 114, 162, 168, 103; 707/205, 206

(56) References Cited

U.S. PATENT DOCUMENTS

| | | | | |
|---|---|---|---|---|
| 5,269,019 A | * | 12/1993 | Peterson et al. ............ 395/621 |
| 5,357,475 A | * | 10/1994 | Hasbun et al. .............. 711/103 |
| 5,371,885 A | * | 12/1994 | Letwin ....................... 395/621 |
| 5,375,233 A | * | 12/1994 | Kimber et al. .............. 395/621 |
| 5,404,485 A | * | 4/1995 | Ban ........................... 711/202 |
| 5,479,638 A | * | 12/1995 | Assar et al. ................ 711/103 |
| 5,485,595 A | * | 1/1996 | Assar et al. ................ 711/103 |
| 5,524,230 A | * | 6/1996 | Sakaue et al. .............. 711/103 |
| 5,542,064 A | * | 7/1996 | Tanaka et al. .............. 395/441 |
| 5,561,786 A | * | 10/1996 | Morse ...................... 395/497.01 |
| 5,572,466 A | * | 11/1996 | Sukegawa ............... 365/185.33 |
| 5,579,507 A | * | 11/1996 | Hosouchi et al. ........... 711/171 |
| 5,602,995 A | * | 2/1997 | Hendel et al. .............. 711/209 |
| 5,649,139 A | * | 7/1997 | Weinreb et al. ............. 395/412 |
| 5,673,383 A | * | 9/1997 | Sukegawa ............. 395/182.06 |
| 5,802,551 A | * | 9/1998 | Komatsu et al. ............ 711/103 |

* cited by examiner

Primary Examiner—Hong Kim
(74) Attorney, Agent, or Firm—Staas & Halsey LLP

(57) ABSTRACT

Search speed in memory management of memory devices provided with a nonvolatile memory medium that is rewritable in each block which serves as the unit of data storage is improved by providing a free block table and a conversion table. The free block table stores data for each free block address number corresponding to a data-writable free block. The conversion table in the free block table converts externally designated address numbers into address data for blocks and sharing memory area. The conversion table is provided with block address data identification components that identify a block address as being empty or not.

16 Claims, 13 Drawing Sheets

| | CONVERSION TABLE | |
|---|---|---|
| 0 | 1 | 0 4 |
| 1 | 1 | 0 5 |
| 2 | 0 | 0 0 |
| 3 | 1 | 0 7 |
| 4 | 1 | 0 8 |
| 5 | 1 | 0 9 |
| 6 | 1 | 1 0 |
| 7 | 1 | 9 9 |
| 8 | 1 | 9 9 |
| 9 | 0 | 0 1 |

| FREE BLOCK TABLE | |
|---|---|
| 0 | 0 6 |
| 1 | 9 9 |
| 2 | 0 2 |
| 3 | 0 3 |

| FLASH MEMORY | | | |
|---|---|---|---|
| 0 0 | 2 | 0 6 | |
| 0 1 | 9 | 0 7 | |
| 0 2 | | 0 8 | |
| 0 3 | | 0 9 | |
| 0 4 | | 1 0 | |
| 0 5 | | 1 1 | |

| | | CONVERSION TABLE | |
|---|---|---|---|
| 100i | 0 | 1 | 04 — 10c |
| | 1 | 1 | 05 |
| | 2 | 0 | 99 |
| | 3 | 1 | 07 |
| | 4 | 1 | 08 |
| | 5 | 1 | 09 — 10a |
| | 6 | 1 | 10 |
| | 7 | 1 | 99 |
| | 8 | 1 | 99 |
| | 9 | 0 | 01 |

10b

FREE BLOCK TABLE

| | | |
|---|---|---|
| 10ln | 0 | 06 — 10f |
| | 1 | 00 |
| | 2 | 02 — 10e |
| | 3 | 03 |

FLASH MEMORY

| | | | | |
|---|---|---|---|---|
| 102g — | 00 | | 06 | — 102r |
| | 01 | 9 | 07 | |
| | 02 | | 08 | |
| | 03 | | 09 | — 13 |
| | 04 | | 10 | |
| | 05 | | 11 | |

106D { read-pointer 2 — 10g
write-pointer 2 — 10h
stack-pointer 9 — 10d

FIG. 29

CONVERSION TABLE

| | | |
|---|---|---|
| 0 | 0 | 0 0 |
| 1 | 1 | 9 9 |
| 2 | 0 | 0 1 |
| 3 | 1 | 9 9 |
| 4 | 0 | 0 2 |
| 5 | 0 | 1 1 |
| 6 | 0 | 0 3 |
| 7 | 0 | 9 9 |
| 8 | 0 | 0 4 |
| 9 | 1 | 9 9 |

FREE BLOCK TABLE

| | |
|---|---|
| 0 | 9 9 |
| 1 | 9 9 |
| 2 | 9 9 |
| 3 | 9 9 |

FLASH MEMORY

| | | | |
|---|---|---|---|
| 0 0 | 0 | 0 6 | |
| 0 1 | 2 | 0 7 | |
| 0 2 | 4 | 0 8 | |
| 0 3 | 6 | 0 9 | |
| 0 4 | 8 | 1 0 | |
| 0 5 | | 1 1 | 5 |

106F {
- read-pointer | 0 | — 10g
- write-pointer | 0 | — 10h
- stack-pointer | 1 | — 10d

MEMORY MANAGEMENT DEVICE INCLUDING A FREE BLOCK TABLE AND A CONVERSION TABLE WITH A FREE BLOCK ADDRESS DATA IDENTIFICATION COMPONENT

BACKGROUND OF THE INVENTION

1. Field of the Invention

The present invention relates generally to a memory management device for memory devices, and relates particularly to a memory management device, for memory devices, in which a free block address table for storing address data for data-writable free blocks and a conversion table for performing conversion thereof into corresponding block address data within the free block table in accordance with address numbers designated from outside the memory device are shared to make efficient use of table memory area.

2. Description of the Related Art

As described in Interface magazine (July 1989, pp. 203–209) and in Japanese Laid-Open Patent Application (Japanese Publication) 4-184645, conventional memory management devices manage memory by dividing memory areas (which are employed by a process involving dynamic protection and freeing during program execution) into a plurality of blocks of the same given size.

Such memory management devices include, for example, that disclosed in Japanese Laid-Open Patent Application (Japanese Publication) 6-208502, which is directed to more efficient utilization of memory area and a reduction in the time required to search for free blocks, and that of Japanese Laid-Open Patent Application (Japanese Publication) 4-219836, which is aimed at more effective utilization of file resources by effective allocation of free blocks within block partitions.

This type of memory management device includes a conversion table which is used for converting addresses designated by an external main device into block address data corresponding thereto and a free block table which stores free block addresses of free blocks, i.e., data-writable blocks are provided as separate tables. The division of responsibility between the tables is determined so that table data management can be performed smoothly.

This memory management device will be described using the example of a device which has addresses, 1~90, that can be designated by an external main device, in which the number of data (the number of unit data transferable to and from the external main device) written per block is one and which has 100 blocks.

Assuming that a capacity of one byte is required in the free block table for storing each block address, a capacity of 90 bytes is required by the conversion table and a capacity of 100 bytes is required by the free block table.

The memory management device can employ, for example, a memory card.

The memory card can be an IC card, a magnetic card, or the like.

Some IC cards house microcomputers and semiconductor memory.

(IC Card Types)

IC cards are classified as IC memory cards that house large-capacity semiconductor memory, IC cards that house microcomputers and semiconductor memory and that are provided with a CPU that has a storage function and a processing function, and multi-functional IC cards that are provided with CPU-equipped IC card functionality and that are further capable of data input and display in single card form when used with a keyboard display.

(Example of a System a Employing Memory Card)

An example of a system which employs this type of memory card will be given below.

A microcomputer and memory are mounted on this IC card using high-density mounting technology. This IC card houses, for example, an 8-bit microcomputer and a memory comprising 64-Kbit EEPROM; data exchange with an external device, under management by the microcomputer control program, takes place through a contact point furnished on the surface of the IC card.

In this IC card, the memory area is provided with a conversion memory table and a free block (data-writable block) table.

However, in the memory management device described above, the conversion memory table and the free block table are provided to separate tables making it impossible to reduce the storage capacity of the storage medium.

In the above described example, with this type of memory management device, the number of free blocks in the initial state (when no data has yet been stored in any of the blocks) is 100, and thus all 100 byte of data is required to be written in the free block table.

On the other hand, with this type of memory management device, in the case which the number of free blocks is 10, the capacity of the free block table in which the data is written is 10 bytes with the remaining 90-byte capacity remaining unused.

Thus, with this type of memory management device, a memory area equivalent to 90 bytes remains unused during data write operations, and this surplus memory area is protected, preventing more efficient use of the memory area.

SUMMARY OF THE INVENTION

An object of the present invention is to reduce unused memory area within blocks to make efficient memory area utilization possible, and to reduce the number of memories to be managed.

A further object of the present invention is to make the storage medium more compact without reducing search speed.

The present invention solves the problem noted above by sharing the free block table and the conversion table. The invention is described more specifically herein below.

(1) First Aspect of the Invention

The first aspect of the invention is a memory device provided with a nonvolatile memory medium that is rewritable in each block which serves as the unit of data storage. The memory device of the invention comprises a free block table for storing data for each free block address number corresponding to a data-writable free block. The memory device of the invention further comprises a conversion table, located in the free block table, for storing address data for blocks corresponding to address numbers designated from outside the memory device and for performing designated address number-block address data conversion. In the memory device of the present invention, the conversion table is provided with a free block address data identification component for identifying block address data.

Nonvolatile memory medium refers to, for example, flash EEPROM. Block refers to an erasable unit.

With the present invention, in a nonvolatile memory medium which is rewritable in each block (the unit of data storage), data is stored in a free block table for each free block address number corresponding to a data-writable free block, address numbers designated from outside the memory device are converted to block address data by a conversion table provided within the free block table, and the free block address data is identified by a free block address data identification component in the conversion table.

Since the conversion table is placed within the free block table and the tables are shared, the table capacity can be reduced by an amount equivalent to the conversion table, so the memory medium can be made more compact.

By using, for example, a flag located at the lead position of a conversion table address component as the free block address data identification component, it is possible to efficiently search through the conversion table and the free block table, and to avoid a reduction in search speed, even in compact storage media.

(2) Second Aspect of the Invention

The second aspect of the invention employs the free data block component (the area excluding the conversion table in the free block table) as a memory area component for first in first out processing whereby output proceeds sequentially starting from the data input first, and, when retrieving data from the conversion table, conversely employs the free data block table as a memory area component for last in first out processing whereby output proceeds sequentially starting from the data most recently stored.

Here, a component that processes by FIFO (first in first out) can be used as the memory area component for first in first out processing.

A component that processes by LIFO (last in first out) can be used as the memory area component for last in first out processing.

Since the second aspect of the invention employs the free data block component (the area excluding the conversion table in the free block table) as a memory area component for first in first out processing whereby output proceeds sequentially starting from the data input first, and, when retrieving data from the conversion table, conversely employs the free data block table as a memory area component for last in first out processing whereby output proceeds sequentially starting from the data most recently stored, free block searches and registration can be performed rapidly.

(3) Third Aspect of the Invention

The third aspect of the invention employs the free block table as a queue component for awaiting processing, and, during data retrieval, conversely employs the free block table as a stack component for last in first out processing whereby output proceeds sequentially starting from the item most recently stored.

A component that processes by queuing can be used as the queue component, in the invention.

A component that processes by stacking can be used as the stack component, in the invention.

Since the third aspect of the invention employs the free block table as a queue component for awaiting processing, and, during data retrieval, conversely employs the free block table as a stack component for last in first out processing whereby output proceeds sequentially starting from the item most recently stored, free block searches and registration can be performed with speed and reliability.

(4) Fourth Aspect of the Invention

The fourth aspect of the invention employs the free block component as a memory area component for first in first out processing whereby output proceeds sequentially starting from the item input first, and, when retrieving data from the conversion table, conversely employs it as a memory area component for last in first out processing whereby output proceeds sequentially starting from the item most recently stored.

Since the fourth aspect of the invention employs the free block component as a memory area component for first in first out processing whereby output proceeds sequentially starting from the item input first, and, when retrieving data from the conversion table, conversely employs it as a memory area component for last in first out processing whereby output proceeds sequentially starting from the item most recently stored, free block searches and registration can be performed rapidly.

(5) Fifth Aspect of the Invention

The fifth aspect of the invention searches table contents by searching for registrable areas from free block components following the sequence of the conversion table during registration of free blocks.

Since the fifth aspect of the invention searches table contents by searching for registrable areas from free block components following the sequence of the conversion table during registration of free blocks, the search time can be reduced.

The following are examples of locations for the free block table in the present invention described above.

First, the free block table can be located in memory in a memory card. This allows the memory to be made more compact. Memory cards include magnetic cards and IC cards.

Next, the free block table can be located in random access memory. This allows data write operations to be performed rapidly.

Further, the free block table can be located in flash memory. This allows data write and read operations to be performed rapidly.

BRIEF DESCRIPTION OF THE DRAWINGS

FIG. 29 is a drawing depicting data structure;

FIG. 30 is a drawing depicting data structure;

FIG. 31 is a drawing depicting data structure;

FIG. 32 is a drawing depicting an example of a pointer;

DESCRIPTION OF THE PREFERRED EMBODIMENTS

Figure 1:
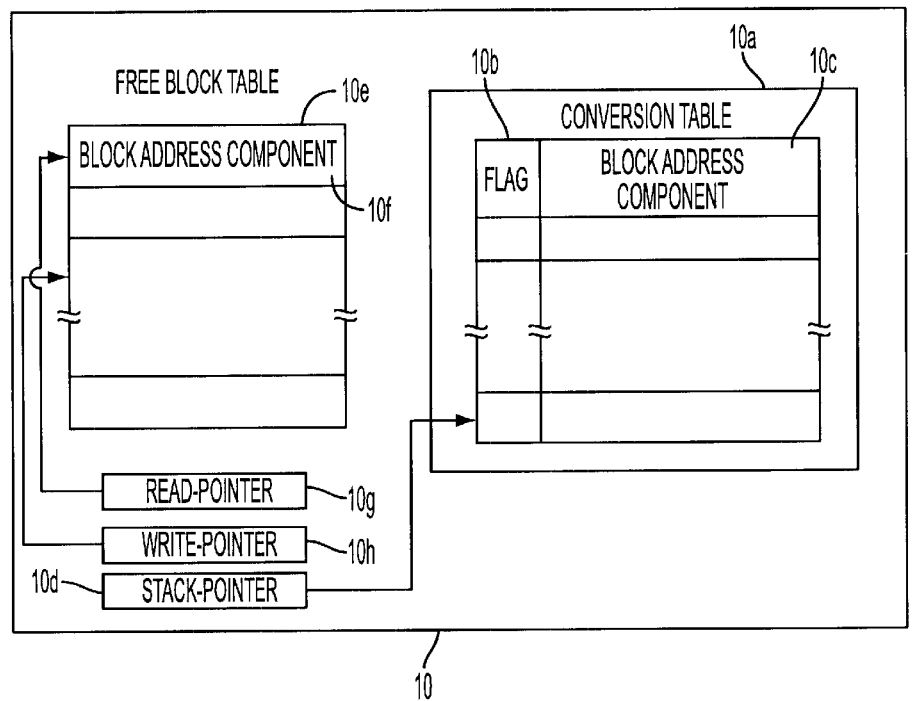
FIG. 1 is a principal component block diagram depicting an embodiment of the present invention.

Embodiments of the present invention will be described below, referring to the drawings.

In the present embodiment, the table capacity is reduced, by an amount equivalent to the conversion table because the conversion table is placed within the free block table and the tables are shared, so the memory medium is more compact and managed memory is reduced.

(Free Block Table)

FIG. 1 is a drawing which depicts a free block table.

Here, block refers to the minimum unit from which data can be erased.

This free block table 10 is provided with the free block component 10e containing block address components 10f and with the conversion table component 10a containing block addresses 10c. Free block addresses are stored in the block addresses 10f of the free block component 10e or in the block addresses 10c of the conversion table 10a.

When a free block address is not stored in the free block component 10e, a block address number that indicates that a free block address is not present in the free block component 10e is designated.

(Conversion Table)

The conversion table 10a is provided with a plurality of block address components 10c. A desired block address component 10c is selected by an externally provided address designation signal.

Block addresses corresponding to externally designated addresses or to free block addresses are stored in this conversion table 10a. Therefore, if an address is designated, designated address-block address conversion can be performed.

Furthermore, with this conversion table 10a, when a block address corresponding to the designated address is not stored in the conversion table, a block address number that indicates that a block address is not present in the conversion table 10a is designated.

Block address components 10c are provided in the lead position with flag components 10b that serve as free block address identification components.

The flag component 10b is a flag used for determining a stored block address; it can be determined whether or not a stored block address is a free block address by noting whether or not it has been flagged.

Free area block addresses can be read out from, and free area block address data can be written to, the block address components 10c due to the provision of stack pointers 10d.

(Free Block Management Pointers)

The read pointer 10g and the write pointer 10h are pointers used in managing the free block component 10e of the free block table 10.

A block address component 10f in the free block component 10e can be read out through the free block read pointer 10g.

Data can be written to a block address component 10f in the free block component 10e through the free block write pointer 10h.

Thus, a free block address is read from a free block component 10e through the read pointer 10g; when this read-out free block address is retrieved, the system proceeds to read the next free block address.

In this way, when a read operation is executed at the last address in the free block component 10e, the system returns to the initial address in block address component 10f and reads the block address component data.

When a free block address has been written to a block address component 10f in the free block component 10e through the free block write pointer 10h, a write operation is executed at the next address, and when a write operation has been executed at the last address number in the table, the system returns to the initial address, where an address number write operation is executed.

The block address component 10c of the conversion table 10a is managed through the stack pointer 10d.

A free block address can be written in the conversion table through the stack pointer 10d.

When searching for a free block with the stack pointer, the search is conducted beginning at the currently indicated address, and the search is conducted so as to return to the lead position in the conversion table 10a; the search is terminated when a free block address is found or when the lead position in the conversion table 10a is reached.

(Storage Medium)

Here, the storage medium refers to a nonvolatile storage medium, for example, flash EEPROM.

(System Structure)

Figure 2:
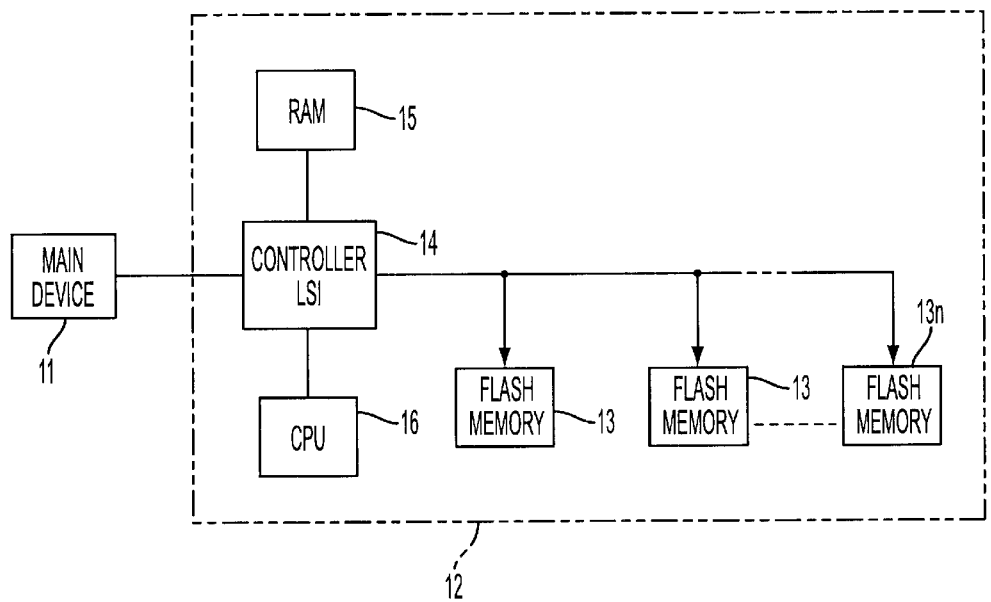
FIG. 2 is diagram depicting the system structure in the embodiment of the present invention.

FIG. 2 is a block diagram which depicts an example of a system in which the block table depicted in FIG. 1 is located in a random access memory.

In the block diagram of FIG. 2, the main unit 11 is a computer device. The storage device 12 is connected through a bus to the main unit 11.

The storage device 12 comprises a controller 14 for internal control of the memory device, a random access memory contained in a memory card 15 for temporarily writing data on the basis of control signals issued from the controller 14, a CPU 16 that is operated by control signals issued from the controller 14, and a plurality of flash memories 13 . . . 13n that perform write and read operations on the basis of control signals issued from the controller 14.

In this embodiment, the free block table 10 depicted in FIG. 1 is located in the random access memory contained in the memory card 15.

(Example of Table Data)

FIGS. 3 through 6 depict specific examples of data stored in the tables (hereinbelow referred as table data) depicted in FIG. 1. In this case, the outside address numbers which can be designated by an external main device are 0–9, the number of data which is written per block is one, and the number of the address written in the free block component 10*e* is 4.

This table data is stored in the random access memory 15 depicted in FIG. 2.

Figures 3, 4, 5, 6:
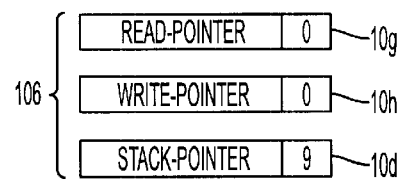
FIG. 3 is a partial enlarged view of FIG. 1.
FIG. 4 is a partial enlarged view of FIG. 1.
FIG. 5 is a drawing depicting an example of the storage medium in an embodiment of the present invention.
FIG. 6 is a drawing depicting an example of the pointer in an embodiment of the present invention.

FIG. 3 depicts the data stored in the conversion table 10*a*. Element 100*i* indicates an outside address number, element 10*b* indicates a flag used for determination of the stored block address, and element 10*c* indicates a block address storage area.

The block address storage area stores block address or free block address corresponding to the outside address number.

The flag 10*b* serves as a free block address identification component and indicated whether an address stored in the block address storage area is the block address when it is 1 or the free block address (when it is 0). Besides, a block address "99" stored in the block address storage area 10*c* indicates that the block address corresponding to the outside address is not stored.

For example, in FIG. 3, when the outside address number 100*i* is "6", the flag 10*b* used for determination of the stored block address has a value of "1" and the block address is "10".

FIG. 4 depicts data stored in the free block component 10*e*. Element 101*n* indicates an address number of the free block component and element 10*f* indicates a block address storage area.

FIG. 5 depicts an example of the data structure of the storage medium 102, for example, a flash memory 13.

Element 102*g* indicates a block address number and element 102*r* indicates an external address number for data stored in the block.

FIG. 6 depicts a pointer 106 comprising the read pointer 10*g* used in reading from the free block component 10*e* depicted in FIG. 4, the write pointer 10*h* used in writing to the free block component, and the stack pointer 10*d* used in read/write operations on the conversion table 10*a* depicted in FIG. 3.

Tables 10*a* and 10*e* can be linked through this pointer 106; the tables 10*a* and 10*e* can be simply arrayed in a single column, placed in a tree structure, or placed in a network structure.

(Operation of the Embodiment)

The operation of the present embodiment will be described in the context of a block search routine.

Figure 7:
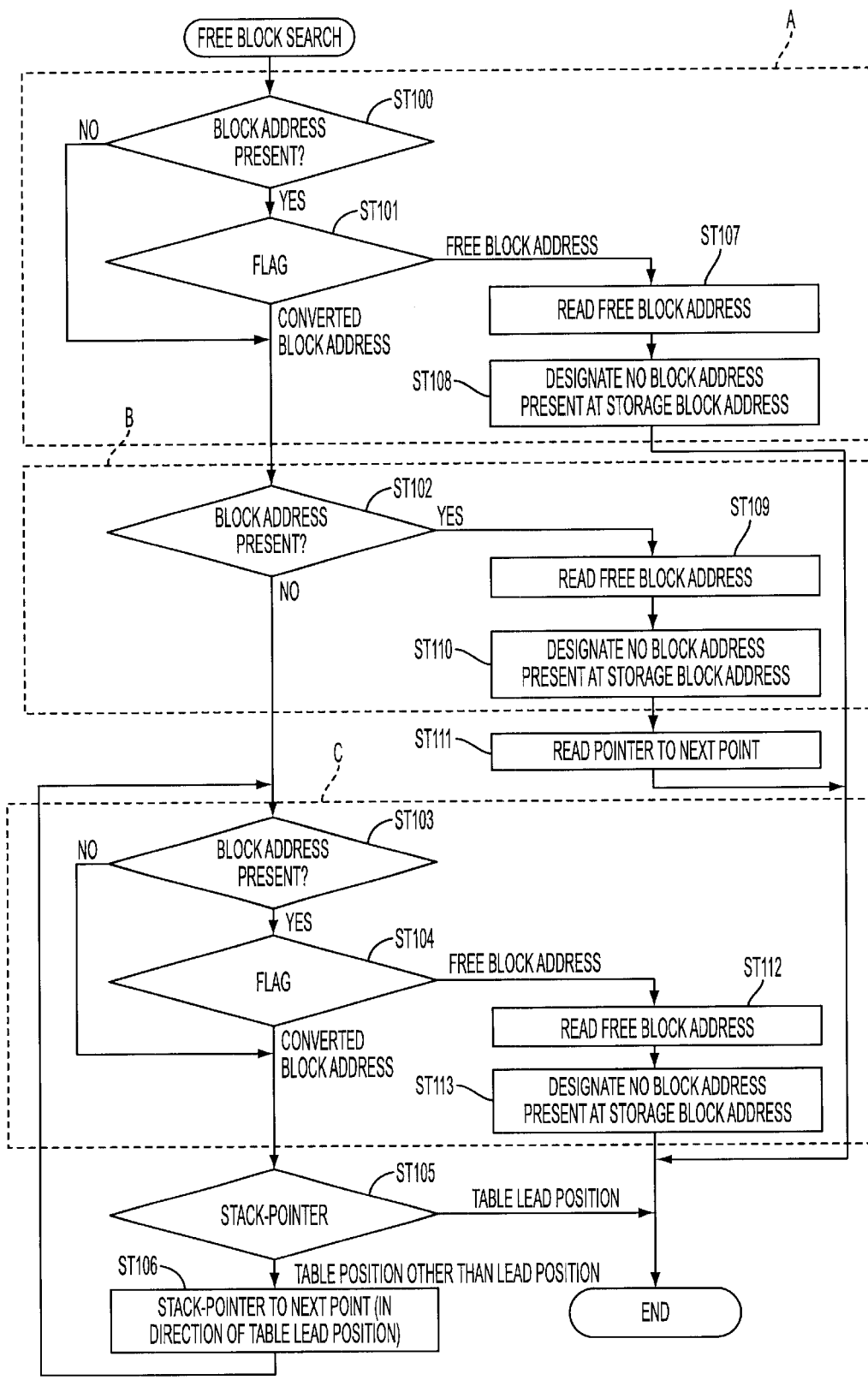
FIG. 7 is a flow chart illustrating operations in an embodiment of the present invention.

FIG. 7 is a flow chart which depicts a search routine in the free block table 10.

(Free Block Search Routine)

In the flow chart of FIG. 7, section A indicates processes associated with addresses in the conversion table that indicate external addresses, section B indicates free block table processes performed by the read pointer, and section C indicates free block processes performed by the stack pointer.

In FIG. 7, it is first determined whether a block address is stored at an address in the conversion table that indicates an external address (ST100).

In the event that a block address is stored at an address in the conversion table (the outcome of ST100 is Y), a determination as to whether it is a free block address or a converted block address is made through the flag (ST101).

In the event that it is determined in ST100 that a block address is not stored at an address in the conversion table (the outcome of ST100 is N), the determination process of ST102 is executed.

In the event that is determined through the flag in ST101 that an address is a free block address, the free block address is read out (ST107).

After a free block address has been read out, it is assumed that a block address is no longer present at the storage block address (ST108), and the foregoing process is terminated.

On the other hand, if it is determined through the flag in ST101 that an address is a converted block address, a determination as to whether a block address is stored in the free block component 10*e* is made (ST102).

When a block address is stored at the address indicated by the read pointer 10*g* (the outcome of ST102 is Y), the free block address is read out (ST109).

After a free block address has been read out, it is assumed that a block address is no longer present at the storage block address (ST110), the read pointer 10*g* depicted in FIG. 1 moves to the next block address component 10*f*, and the foregoing process is terminated.

On the other hand, if it is determined in ST102 that a block address is not stored at the address indicated by the read pointer 10*g* (the outcome of ST102 is N), a determination as to whether a block address is stored in the conversion table 10*a* is made (ST103 through ST106).

When a block address is stored at the address indicated by the stack pointer 10*d* (the outcome of ST103 is Y), a determination is made, through the flag, as to whether it is a free block address or a converted block address (ST104).

If it is determined in ST103 that a block address is not stored at the address indicated by the stack pointer 10*d* (the outcome of ST103 is N), the determination process of ST105 is executed.

On the other hand, if it determined in ST104 that a free block address indicated by the stack pointer 10*d* is stored, the free block address is read out (ST112).

After a free block address has been read out, it is assumed that a block address is no longer present at the block address (ST113) and the foregoing process is terminated.

In the event that it is determined in ST104 that an address is a converted block address, a determination is made as to whether the stack pointer 10*d* depicted in FIG. 1 has reached the lead position of the block address component 10*c* depicted in FIG. 1 (ST105).

In the event that it is determined in ST105 that the lead position of the block address component 10*c* has been reached, the foregoing process is terminated.

In the event that it is determined in ST105 that the lead position in block address component 10*c* has not been reached, the stack pointer 10*d* depicted in FIG. 1 moves to the next block address 10*c* towards the lead position of the conversion table, and repeats the process until the condition of ST104 or ST105 is fulfilled (ST103 through ST106).

The processes depicted in FIG. 7 affords rapid free block search.

Next the process routine for free block registration depicted in FIG. 8 will be described.

(Free Block Registration Routine)

Figure 8:
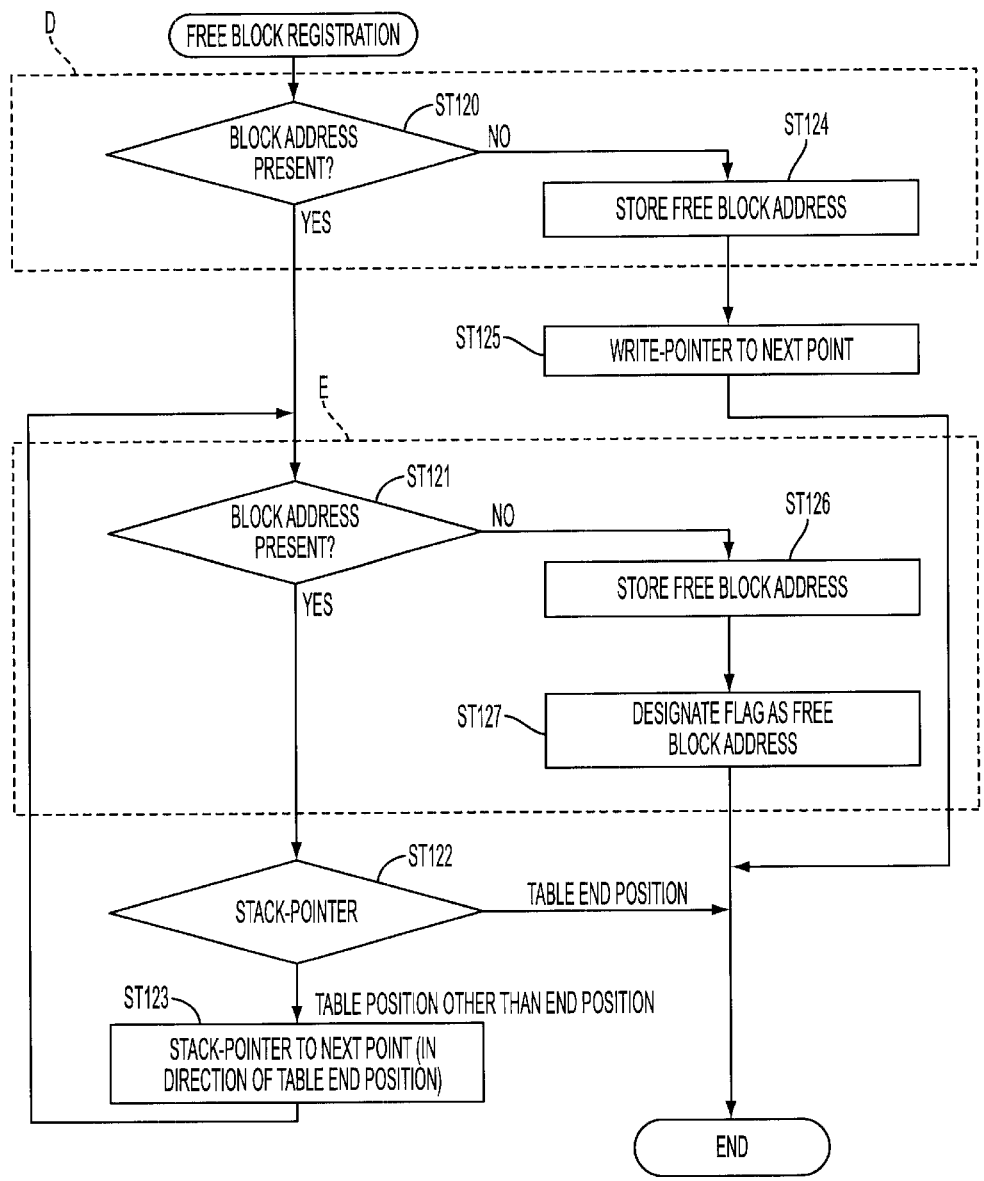
FIG. 8 is a flow chart illustrating operations in an embodiment of the present invention.
Figures 9, 10, 11, 12:
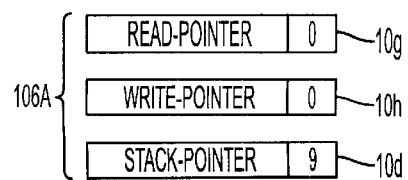
FIG. 9 is a drawing depicting data structure.
FIG. 10 is a drawing depicting data structure.
FIG. 11 is a drawing depicting data structure.
FIG. 12 is a drawing depicting an example of a pointer.
Figure 13:
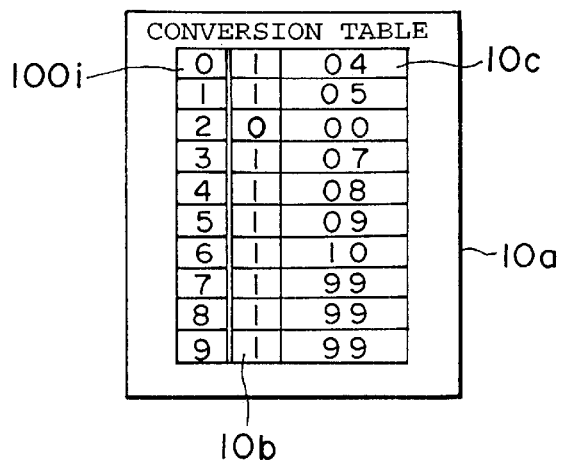
FIG. 13 is a drawing depicting data structure.
Figure 14:
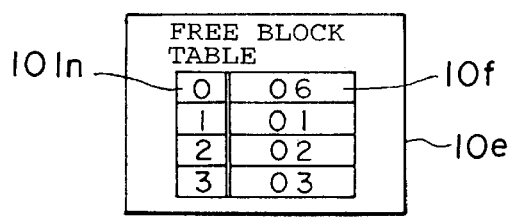
FIG. 14 is a drawing depicting data structure.
Figure 15:
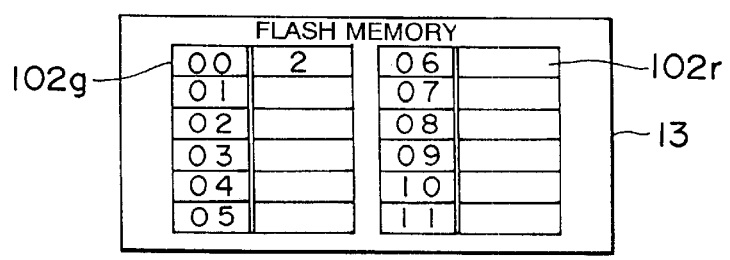
FIG. 15 is a drawing depicting data structure.
Figure 16:
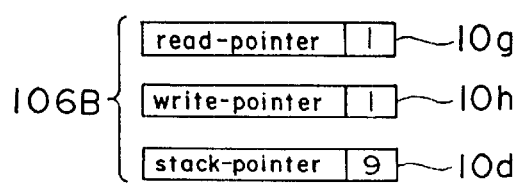
FIG. 16 is a drawing depicting an example of a pointer.
Figures 17, 18, 19, 20:
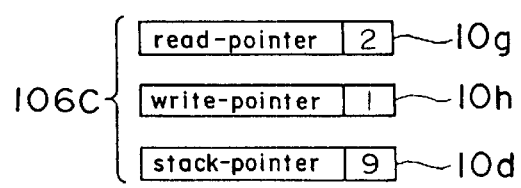
FIG. 17 is a drawing depicting data structure.
FIG. 18 is a drawing depicting data structure.
FIG. 19 is a drawing depicting data structure.
FIG. 20 is a drawing depicting an example of a pointer.
Figures 21, 22, 23, 24:
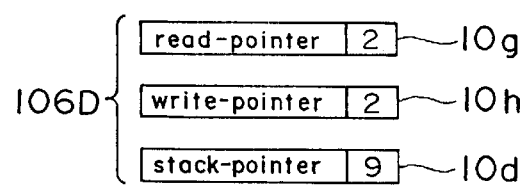
FIG. 21 is a drawing depicting data structure.
FIG. 22 is a drawing depicting data structure.
FIG. 23 is a drawing depicting data structure.
FIG. 24 is a drawing depicting an example of a pointer.
Figure 25:
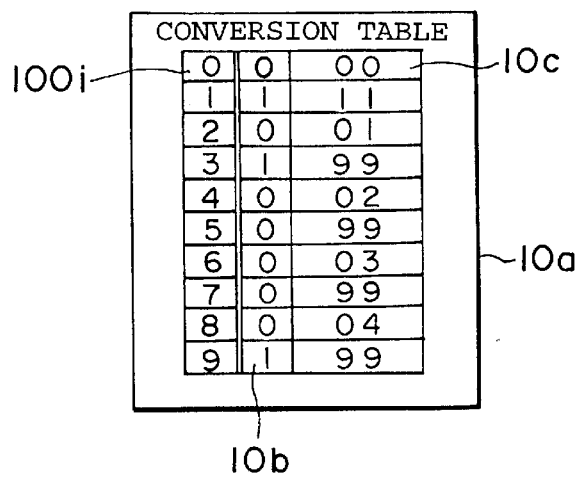
FIG. 25 is a drawing depicting data structure.
Figure 26:
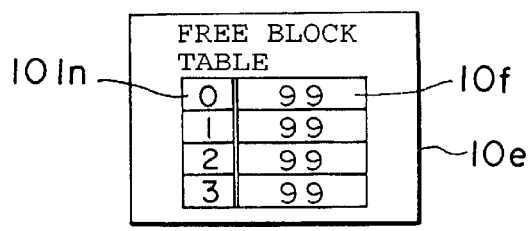
FIG. 26 is a drawing depicting data structure.
Figure 27:
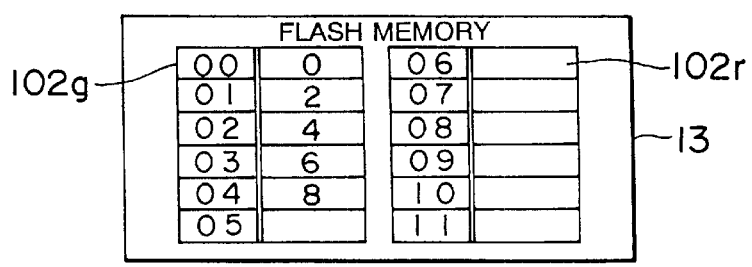
FIG. 27 is a drawing depicting data structure.
Figure 28:
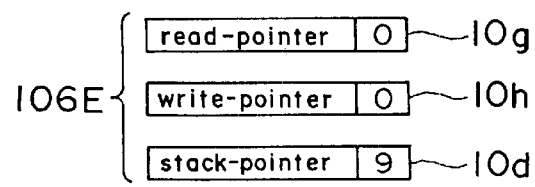
FIG. 28 is a drawing depicting an example of a pointer.

In the flow chart of FIG. 8, section D indicates processes of the free block component 10*e* depicted in FIG. 1 which are performed by the write pointer and section E indicates conversion table processes which are performed by the stack pointer.

First, a determination is made as to whether a free block address can be stored in the free block component 10*e* (ST120).

If a block address is stored at an address indicating the write pointer 10*h* (the outcome of ST120 is Y), a determination is made as to whether a free block address can be stored in the conversion table 10*a*(ST121).

In the event that it is determined in ST120 that a block address is not stored in block component 10*e* indicating the write pointer 10*h* (the outcome of ST120 is N), a free block address is stored in the free block component 10e depicted in FIG. 1 (ST124).

After a free block address has been stored in the free block component 10e depicted in FIG. 1, the write pointer depicted in FIG. 1 moves to the next block address component 10f (ST125) and the foregoing process is terminated.

In the event that a block address is stored at the address indicated by the stack pointer 10d in ST121 (the outcome is Y), a determination is made as to whether the address indicated by the stack pointer 10d is at the end of the block address component 10c (ST122).

If it is at the end of the block address component 10c, the foregoing process is terminated.

If it is not at the end of the block address component 10c depicted in FIG. 1, the stack pointer 10d moves to the next point and the processes are repeated until the end of the conversion table 10a is reached (ST121 through ST123).

On the other hand, in the event that a block address is not stored at the address indicated by the stack pointer 10d in ST121 (the outcome of ST121 is N), a free block address is stored in the conversion table 10a (ST126).

After storing a free block address in the conversion table 10a, a conversion table 10a flag serves as the free block address (ST127), and the foregoing process is terminated.

The processes depicted in FIG. 8 afford rapid and reliable free block registration.

Next, the operation of the overall memory device will be described on the basis of FIG. 1, FIG. 2, FIG. 33, and FIG. 34.

(Overall Memory Device Operation)

Figure 33:
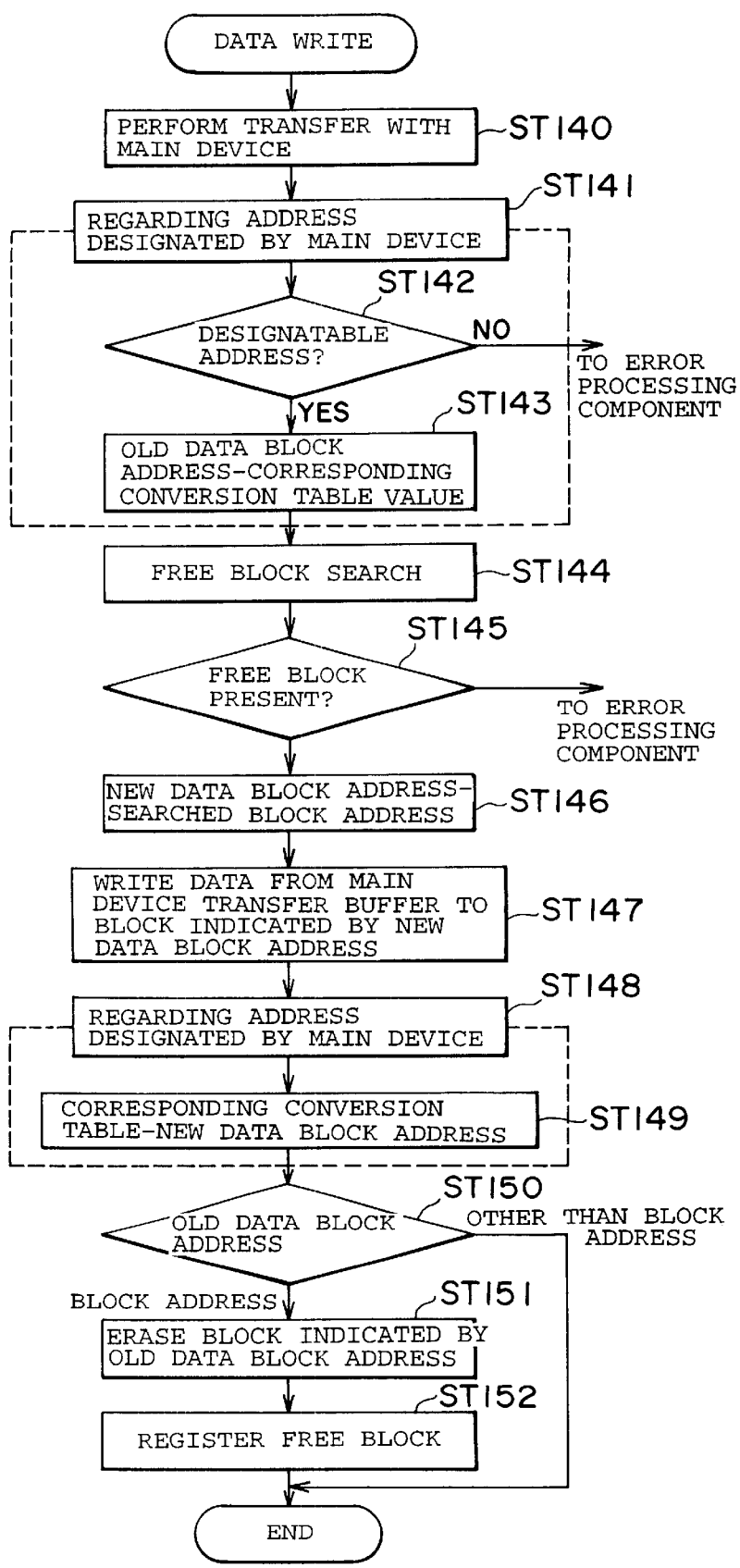
FIG. 33 is a flow chart illustrating operations in an embodiment of the present invention.
Figure 34:
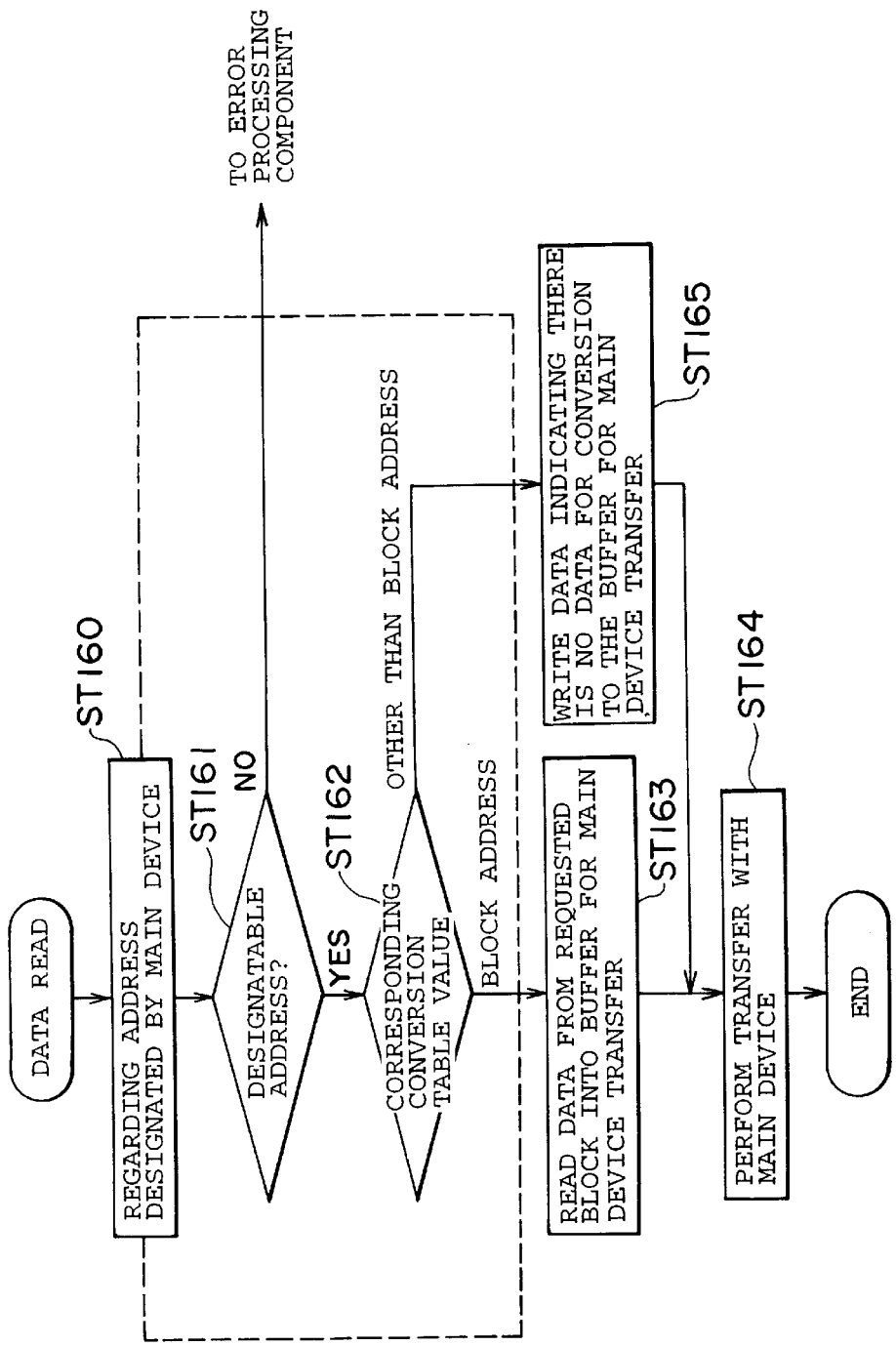
FIG. 34 is a flow chart illustrating operations in an embodiment of the present invention.

FIG. 33 and FIG. 34 are flow charts depicting the operation of the overall memory device.

First, in FIG. 33, data transfer from the main device 11 depicted in FIG. 2 to a buffer provided in the storage device 12 is executed (ST140).

At this time, the following processes associated with an address designated, for example, by the main device 11 are executed (ST141).

Specifically, a determination is made by the CPU 16 of the storage device 12 as to whether it is a designatable address (ST142).

In the event that it is determined by the CPU 16 of the storage device 12 to be a designatable address, an old data block address is read out (ST143) from the corresponding conversion table 10a depicted in FIG. 1.

After reading out the old data block address from a conversion table 10a depicted in FIG. 1 that corresponds to the old data block address, a free block search is conducted by a subroutine process (ST144).

When conducting a free block search by a subroutine process, a determination is made as to whether there is a free block in the table 10 (ST145).

In the event that it is determined that there is a free block in the table 10, a new data block address is designated as the block address searched by the CPU 16 depicted in FIG. 2 (ST146).

After a new data block address has been designated as the block address searched by the CPU 16 depicted in FIG. 2, data is written from a buffer (not shown in the drawings) into the block indicated by the new data block address (ST147).

Next, the following processes associated with an address designated by the main device 11 depicted in FIG. 2 are executed (ST148).

Specifically, the data block address at which data was just written is registered to the corresponding conversion table 10a (ST149).

After the data block address at which data was just written has been registered to the corresponding conversion table 10a, a check is made by the CPU 16 depicted in FIG. 2 to determine whether the old block address data is a block address (ST150).

When the CPU 16 depicted in FIG. 2 has checked if it is a block address, the block indicated by the old data block address is erased (ST151).

After the block indicated by the old data block address has been erased, registration of a free block in the table 10 is performed by a subroutine process. At this time, processing follows the registration process routine depicted in FIG. 8.

When the foregoing processes are completed, the process is terminated.

In the aforementioned ST142, if it is not a designatable address, error processing is performed in an error processing component (not shown).

In the event that it is determined in ST145 that there is no free block, error processing is performed in an error processing component (not shown).

In the event that it is determined in ST150 that there is no block address, the foregoing process is terminated.

In the flow chart described above, it is possible to accurately and rapidly write desired data to free blocks in the table 10.

Therefore, conducting the aforementioned process in the present embodiment makes it possible to provide the IC card user (when implemented, for example, in an IC card) with a memory device that is compact.

(Data Read Operation)

In FIG. 34, the following processes associated with an address designated by the main device 11 depicted in FIG. 2 are executed when a data read operation is performed (ST160).

Specifically, it is determined, for example, in the CPU 16 depicted in FIG. 2, whether it is a designatable address (ST161).

Here, when it is a non-designatable address, error processing is performed in an error processing component.

Alternatively, when it is a designatable address, a determination as to whether a value in the corresponding conversion table 10a is a block address is made (ST162).

In the event that it is determined in ST162 that it is a block address, data is temporarily written from the requested block to a buffer for transfer to the main device 11 (ST163).

At this time, data read out from flash memory can be written to the buffer.

After the process in ST163 has been executed, data is transferred from the transfer buffer of the memory device 12 to the main device 11 (ST164).

When the above processes are completed, the process is terminated.

In the event that it is determined in ST161 that it is not a designatable address, error processing is performed in an error processing component (not shown).

In the event that in ST163 a value in the corresponding conversion table is other than the desired block address, data indicating that there is no data for conversion is written to the buffer for transfer to the main device 11 (ST165).

After the above processes have been executed, the process of ST164 is executed.

Therefore, the flow chart depicted in FIG. 34 affords a rapid data read operation.

(Specific Examples of Table Data)

FIG. 9 through FIG. 32 depict specific examples of the table data in the tables depicted in FIG. 1.

FIGS. 9, 13, 17, 21, 25, 29, and 35 depict data stored in conversion table 10a. Element 100i indicates an outside address number, element 10b indicates a flag used for determination of the stored block address, and element 10c indicates a block address storage area.

The flag serves as a free block address data identification component.

Figure 35:
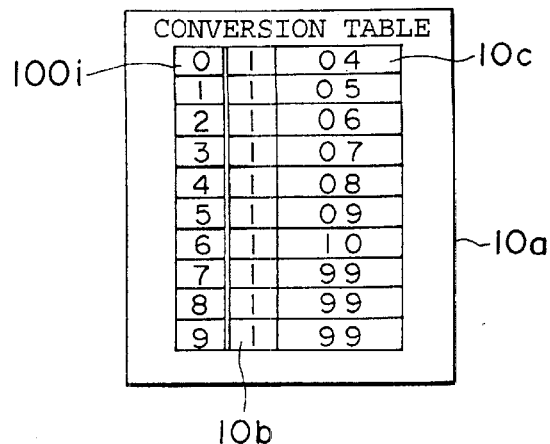
FIG. 35 is a drawing depicting data structure.
Figure 36:
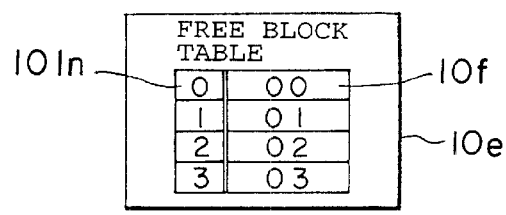
FIG. 36 is a drawing depicting data structure.
Figure 37:
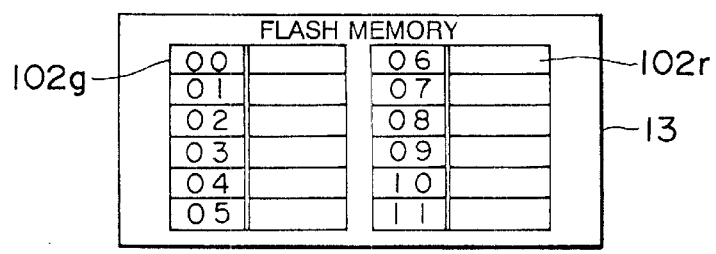
FIG. 37 is a drawing depicting data structure.
Figure 38:
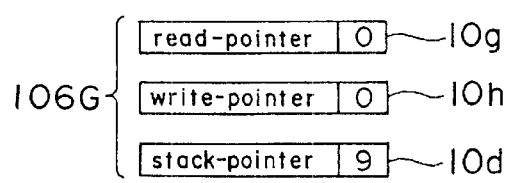
FIG. 38 is a drawing depicting an example of a pointer.

For example, in FIG. 35, when the outside address number 100i is "6", the flag 10b used for determination of the stored block address has a value of "1" and the block address is "10". Therefore, it is indicated that data corresponding to outside address number "6" is written in the block of block address "10" in the flash memory 13.

FIGS. 10, 14, 18, 22, 26, 30, and 36 depict data stored in free block component 10*e*. Element 101*n* indicates an address number of the free block component and element 10*f* indicates a block address storage area.

FIGS. 11, 15, 19, 23, 27, 31, and 37 depict examples of the data structure in, the flash memory 13.

The numeral 102*g* indicates the block address number, and 102*r* indicates an outside address number of the data stored in the block.

FIGS. 12, 16, 20, 24, 28, 32, and 38 each depict a pointer 106 comprising a read pointer 10*g* used in reading from the free block component depicted in FIG. 4, a write pointer 10*h* used in writing to the free block component, and a stack pointer 10*d* used in read/write operations on the conversion table depicted in FIG. 3.

Tables 100 and 101 can be linked through this pointer 106; the tables 100 and 101 can be simply arrayed in a single column, placed in a tree structure, or placed in a network structure.

The provision of this kind of table data to the free block table 10 is suitable in the following case.

The following description assumes 0–9 addresses that can be designated by an external device, a data write capacity of one unit per block, 12 blocks within the device, and 4 free block tables.

When the flag 10*b* in the conversion table 10*a* has a value of "1", the address number written in the block address storage area 10 indicates the free block address, and it indicates the block address.

When a block address is not stored, the block address is "99".

For example, FIGS. 35 through 38 are assumed to depict the interior of the memory device 12 in its initial state; in this state, writing data in the block of the flash memory 13 corresponding to external address "2" results in the state depicted in FIGS. 9 through 12.

Subsequent writing to outside address "2" results in the state depicted in FIGS. 13 through 16.

Further, writing to outside address "9" results in the state depicted in FIGS. 17 through 20.

Here, erasing outside address "2" results in the state depicted in FIGS. 21 through 24.

Writing to outside address "5" when the memory device 12 is in the state depicted in FIGS. 12 through 25 results in the state depicted in FIGS. 29 through 32. As explained above, according to this embodiment, since free addresses corresponding to any outside addresses are stored in the conversion table 10*a*, the free address components 10*e* does not need capacity capable of starting the block addresses of all blocks but enough to store only the block addresses which does not correspond to the outside addresses.

(Other Embodiments)

In the foregoing embodiment, an example employing a stack pointer was described, but the invention is not restricted to this. For example, the memory area component that performs first in first out can be a component that performs processing, for example, by FIFO (first in first out).

The memory area component that performs last in first out can be a component that performs processing, for example, by LIFO (last in first out).

A queue component can be provided and processing can be performed by queuing.

The other embodiments described above not only make it possible to locate the conversion table in the free block table and to share the tables in order to reduce the table capacity by an amount equivalent to the conversion table, but also to conduct search and registration rapidly.

In the first aspect of the invention, the conversion table is placed within the free block table and the tables are shared, so that table capacity can be reduced by an amount equivalent to the conversion table, and the memory medium can thus be made more compact.

Furthermore, by using, for example, a flag located at the lead position of a conversion table address component as a free block address data identification component, it is possible to efficiently search through the conversion table and the free block table, and to avoid a reduction in search speed even in compact storage media.

In the second aspect of the present invention, the free data block component is employed as a memory area component for first in first out processing, so free block searches and registration can be performed rapidly.

In the third aspect of the present invention, the conversion table is employed as a stack component for last in first out processing, so free block searches and registration can be performed with speed and reliability.

In the fourth aspect of the present invention, registration and free block searches when retrieving information from the conversion table can be performed rapidly.

In the fifth aspect of the present invention, search time can be reduced during registration of free blocks. In addition, in the fifth aspect of the present invention search time can be reduced during registration of free blocks by searching table contents from free block components following the sequence of the conversion table.

In the sixth aspect of the present invention, the free block table is placed in memory in a memory card, so memory can be made compact.

In the seventh aspect of the present invention, the free block table is placed in random access memory, so data write operations can be performed rapidly.

In the eighth aspect of the present invention, the free block table is located in flash memory so data write and read operations can be performed rapidly.

What is claimed is:

1. A memory management device for a memory device having a nonvolatile memory which is divided into blocks, each of the blocks being a unit of data storage, comprising:
    a conversion table divided into areas to be accessed corresponding to addresses designated from outside the memory device and having a block address data for each of the blocks of the nonvolatile memory being stored in each of the areas;
    an identification data-storing component contained in said conversion table storing identification data corresponding to each of the areas of the conversion table, said identification data identifying whether block address data stored in each of the areas is a block address of a free block of the nonvolatile memory or is a block address for conversion; and
    a retrieval component retrieving a block address of a free block based on the identification data stored in the identification data-storing component.

2. The memory management device as recited in claim 1, wherein table contents are searched by searching contents of the conversion table using the identification data-storing component following the sequence of the conversion table during search of free blocks.

3. The memory management device as recited in claim 1, wherein the conversion table is stored in memory in a memory card.

4. The memory management device as recited in claim 1, wherein the conversion table is stored in a RAM.

5. The memory management device as recited in claim 1, wherein the conversion table is stored in flash memory.

6. The memory management device as recited in claim 1, further comprising:
    a free block table which is divided into addressable areas and in which an address of the free block in the nonvolatile memory being stored in each of the addressable areas.

7. The memory management device as recited in claim 6, wherein the free block table comprises a free block component having free block addresses.

8. The memory management device as recited in claim 1, wherein each of the blocks is an erasable unit.

9. A memory management device for a memory device having a nonvolatile memory which is divided into blocks, each of the blocks being a unit of data storage, comprising:
   a conversion table divided into areas to be accessed corresponding to addresses designated from outside the memory device and having a block address data for each of the blocks of the nonvolatile memory being stored in each of the areas;
   an identification data-storing component storing identification data corresponding to each of the areas of the conversion table, said identification data identifying whether address data stored in each of the areas is one for a free block of the nonvolatile memory;
   a free block table which is divided into addressable areas and in which an address of the free block in the nonvolatile memory being stored in each of the addressable areas; and
   a pointer indicating an area to be accessed in the free block table, wherein said pointer comprises a read pointer and a write pointer for managing a free block component in the free block table, and a stack pointer for managing a block address component in the conversion table.

10. The memory management device as recited in claim 9, wherein the free block table further comprises a first-in-first-out buffer.

11. The memory management device as recited in claim 9, wherein the free block table comprises a free block component having free block addresses.

12. A memory device comprising:
   a nonvolatile memory divided into blocks, each of the blocks being a unit of data storage;
   a conversion table divided into areas to be accessed corresponding to addresses designated from outside the memory device in which a block address data for each of the blocks of the nonvolatile memory being stored in each of the area is provided;
   an identification data-storing component contained in said conversion table storing identification data corresponding to each of the areas of the conversion table, the identification data identifying whether block address data stored in each of the areas is a block address of a free block of the nonvolatile memory or is a block address for conversion; and
   a retrieval component retrieving a block address of a free block based on the identification data stored in the identification data-storing component.

13. A method for managing a memory device having a nonvolatile memory divided into blocks with each of the blocks being a unit of data storage, a conversion table by which addresses of the blocks of the nonvolatile memory correspond to external addresses designated from outside the memory device, and a free block table storing an address of a free block in the nonvolatile memory, wherein an address of a free block to which data designated from outside the memory device are written is searched by the steps comprising:
   determining whether a block address is stored at an address in the conversion table which indicates an external address;
   determining whether the block address is a free block address or a converted block address when the block address is stored at the address in the conversion table which indicates the external address;
   reading out the free block address if the block address is the free block address;
   reading out a free block address from the free block table if the block address is the converted block address based on an identification data-storing component contained in the conversion table storing identification data corresponding to each of the areas of the conversion table, said identification data identifying whether address data stored in each of the areas is one for a free block of the nonvolatile memory; and
   reading out a free block address from the free block table if the block address is not stored at the address in the conversion table which indicates the external address.

14. The method as recited in claim 13, wherein the free block table comprises a free block component having free block addresses.

15. A method for managing a memory device having a nonvolatile memory divided into blocks with each of the blocks being a unit of data storage, a conversion table by which addresses of the blocks of the nonvolatile memory correspond to external addresses designated from outside the memory device, and a free block table storing an address of a free block in the nonvolatile memory, wherein an address of a free block to which data designated from outside the memory device are written is searched by the steps comprising:
   determining whether a block address, based on an identification data-storing component contained in the conversion table storing identification data corresponding to each of the areas of the conversion table, said identification data identifying whether address data stored in each of the areas is one for a free block of the nonvolatile memory, is stored at an address in the conversion table which indicates an external address;
   determining whether the block address is a free block address or a converted block address if the block address is stored at the address in the conversion table which indicates the external address;
   reading out the free block address if the block address is the free block address;
   determining whether a block address is stored in the free block table if the block address is the converted block address;
   determining whether a block address is stored in the free block table if the block address is not stored at the address in the conversion table which indicates the external address;
   reading out the free block address from the free block table if the block address is stored in the free block table; and
   reading out a free block address from the conversion table if the block address is not stored at the free block table.

16. The method as recited in claim 15, wherein the free block table comprises a free block component having free block addresses.

* * * * *

UNITED STATES PATENT AND TRADEMARK OFFICE
CERTIFICATE OF CORRECTION

PATENT NO. : 6,442,662 B1
DATED : August 27, 2002
INVENTOR(S) : Shinpei Komatsu

It is certified that error appears in the above-identified patent and that said Letters Patent is hereby corrected as shown below:

<u>Title page,</u>
Item [57], ABSTRACT,
Line 11, change "identify" to -- identifies --

Signed and Sealed this

Thirty-first Day of December, 2002

JAMES E. ROGAN
*Director of the United States Patent and Trademark Office*